United States Patent
Zhao et al.

(10) Patent No.: US 8,582,692 B1
(45) Date of Patent: *Nov. 12, 2013

(54) SYSTEMS AND METHODS FOR CALIBRATING DIGITAL BASEBAND DC OFFSET IN AN OFDM RECEIVER

(75) Inventors: Qing Zhao, Milpitas, CA (US); Souvik Dihidar, Santa Clara, CA (US); Leilei Song, Sunnyvale, CA (US); Jungwon Lee, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,212

(22) Filed: Sep. 13, 2012

Related U.S. Application Data

(63) Continuation of application No. 12/353,391, filed on Jan. 14, 2009, now Pat. No. 8,279,955.

(60) Provisional application No. 61/021,173, filed on Jan. 15, 2008.

(51) Int. Cl.
*H04L 25/06* (2006.01)

(52) U.S. Cl.
USPC .......................................... 375/319; 375/316

(58) Field of Classification Search
USPC .................... 375/316, 319, 260, 343
See application file for complete search history.

(56) References Cited

U.S. PATENT DOCUMENTS

| | | | |
|---|---|---|---|
| 5,778,028 A | 7/1998 | Turner | |
| 6,351,227 B1 | 2/2002 | Rudberg | |
| 6,867,718 B2 | 3/2005 | Cesura et al. | |
| 6,868,263 B2 | 3/2005 | Filipovic | |
| 6,970,125 B2* | 11/2005 | Cesura et al. | 341/161 |
| 7,084,791 B2 | 8/2006 | Cesura et al. | |
| 7,280,618 B2 | 10/2007 | Demir et al. | |
| 7,313,125 B2* | 12/2007 | Hori et al. | 370/343 |
| 7,860,174 B2* | 12/2010 | Hammerschmidt et al. | 375/260 |
| 7,957,476 B2* | 6/2011 | Sanada et al. | 375/260 |
| 2001/0033601 A1 | 10/2001 | Nafie et al. | |
| 2003/0174790 A1 | 9/2003 | Ho et al. | |

* cited by examiner

*Primary Examiner* — Daniel Washburn
*Assistant Examiner* — Fitwi Hailegiogis

(57) ABSTRACT

In accordance with the teachings described herein, systems and methods are provided for calibrating DC offset in a receiver. A DC calibration circuit may be used that is configured to remove DC offset from a digital multi-carrier modulated (MCM) signal that includes a sequence of MCM symbols. The DC calibration circuit may include an accumulator and a compensator. The accumulator may be used to determine an estimated DC offset of a current MCM symbol in the sequence of MCM symbols. The compensator may be used to remove the estimated DC offset from a next MCM symbol in the sequence of MCM symbols. The accumulator may also be used to receive a plurality of digital samples that comprise the current MCM symbol and to determine the estimated DC offset by calculating an average of the plurality of digital samples.

10 Claims, 7 Drawing Sheets

SYSTEMS AND METHODS FOR CALIBRATING DIGITAL BASEBAND DC OFFSET IN AN OFDM RECEIVER

CROSS-REFERENCE TO RELATED APPLICATION

This application is a continuation of U.S. application Ser. No. 12/353,391, filed on Jan. 14, 2009, which claims priority from U.S. Provisional Patent Application No. 61/021,173, filed on Jan. 15, 2008, and entitled "Digital Baseband DC Offset Calibration Methods for OFDM Systems," the entirety of which is incorporated herein by reference.

FIELD

The technology described in this patent document relates generally to receivers. More specifically, systems and methods are provided for calibrating digital baseband DC offset in a multi-carrier modulation (MCM) receiver. The technology described herein is particularly well-suited for use in an orthogonal frequency-division multiplexing (OFDM) system, but may also have utility with other multi-carrier modulation schemes.

BACKGROUND

DC offset is a common problem in direct-conversion receivers. DC offset in the received signal may be caused by several factors, such as self mixing at the receiver's RF mixers, calibration residue at the receiver's analog components and carrier leakage from the transmitter. This DC offset is typically less of a problem in OFDM systems because the DC tone is not used for signal transmission. However, there may still be a need to reduce or eliminate DC offset in an OFDM system in order to improve system performance. For example, reducing or cancelling DC offset may reduce the headroom requirement for each module in the analog and data path, prevent clipping during FFT processing due to DC accumulation, and reduce interference leakage from DC tone to other adjacent tones.

Traditionally, DC offset in a received communication signal is calibrated by applying a high pass filter after analog-to-digital conversion. With this method, the performance of DC calibration is dependent on the high-pass corner frequency of the filter. A high corner frequency will add more distortion to the signal, but will require less time to remove the DC offset. A lower corner frequency will result in less distortion, but will take longer to remove the DC offset. Consequently, the receiver either suffers from signal distortion by using a fast high pass filter or suffers from strong DC interference leakage during the first few symbols of a frame by using a slower high pass filter. This tradeoff often proves to be extremely challenging for system designers.

SUMMARY

In accordance with the teachings described herein, systems and methods are provided for calibrating DC offset in a receiver. A DC calibration circuit may be used that is configured to receive a digital multi-carrier modulated (MCM) signal that includes a sequence of MCM symbols. The DC calibration circuit may include an accumulator and a compensator. The accumulator may be used to determine an estimated DC offset of a current MCM symbol in the sequence of MCM symbols. The compensator may be used to remove the estimated DC offset from a next MCM symbol in the sequence of MCM symbols. The accumulator may also be used to receive a plurality of digital samples that comprise the current MCM symbol and to determine the estimated DC offset by calculating an average of the plurality of digital samples. In one embodiment, the modulated digital signal may be modulated with an orthogonal frequency-division multiplexing (OFDM) scheme.

A DC calibration circuit may also include a first timer configured to couple the accumulator to the digital MCM signal while the current MCM symbol is received by the DC calibration circuit, and a second timer configured to pass the estimated DC offset from the accumulator to the compensator such that the estimated DC offset is applied to the digital MCM signal by the compensator while the next MCM symbol is received by the DC calibration circuit.

The accumulator in a DC calibration circuit may include a multiplier configured to divide each of the plurality of digital samples by a total number of digital samples to output a plurality of divided samples, and a memory element coupled in a feedback loop with a summation element and configured to accumulate a sum of the plurality of divided samples as the estimated DC offset. The compensator in a DC calibration circuit may include a memory element configured to receive the estimated DC offset from the accumulator, and a summation element configured to subtract the estimated DC offset from the next MCM symbol in the sequence of MCM symbols.

In one embodiment, the DC calibration circuit may also include a filter circuit configured to correct for DC offset in a first of the sequence of MCM symbols. The filter circuit may be configured to receive a plurality of digital samples that comprise the first of the sequence of MCM symbols and to apply a filter coefficient to the plurality of digital samples to correct for DC offset. The filter circuit may include a multiplier configured to multiple each of the plurality of digital samples by a the filter coefficient to output a plurality of filtered samples, a memory element coupled in a feedback loop with a first summation element and configured to accumulate a sum of the plurality of filtered samples as a DC correction value, and a second summation element configured to subtract the DC correction value from the first of the sequence of MCM symbols to correct for DC offset. The filter circuit may also include a timer configured to couple the DC correction value to the second summation element while the first of the sequence of MCM symbols is received by the DC calibration circuit.

In another embodiment, a DC calibration circuit for a receiver may include an accumulator configured to determine an estimated DC offset for each of the sequence of MCM symbols as it is received by the DC calibration circuit, a memory element configured to store a current MCM symbol in the sequence of MCM symbols while the accumulator is determining the estimated DC offset for the current MCM symbol, and a compensator configured to remove the estimated DC offset from current MCM symbol. The receiver may includes a down converter that down-samples the digital MCM signal prior to its reception by the DC calibration circuit.

In another embodiment, a DC calibration circuit for a receiver may include a means for determining an estimated DC offset of a current MCM symbol in the sequence of MCM symbols, and a means for removing the estimated DC offset from a next MCM symbol in the sequence of MCM symbols.

A method for calibrating digital baseband DC offset in a multi-carrier modulation (MCM) receiver may include the following steps: receiving a digital MCM signal that includes a sequence of MCM symbols, each of the sequence of MCM symbols including a plurality of digital samples; determining an average of the plurality of digital samples for a current MCM symbol in the sequence of MCM symbols, the average being an estimated DC offset for the current MCM symbol; and subtracting the estimated DC offset from a next MCM symbol in the sequence of MCM symbols. In certain embodiments, the method may also include the step of applying a filter coefficient to a first of the sequence of MCM symbols to correct for DC offset.

Another method for calibrating digital baseband DC offset in a multi-carrier modulation (MCM) receiver may include the following steps: receiving a digital MCM signal that includes a sequence of MCM symbols, each of the sequence of MCM symbols including a plurality of digital samples; determining an average of the plurality of digital samples for a current MCM symbol in the sequence of MCM symbols, the average being an estimated DC offset for the current MCM symbol; and subtracting the estimated DC offset from a next MCM symbol in the sequence of MCM symbols.

DETAILED DESCRIPTION

Figure 1:
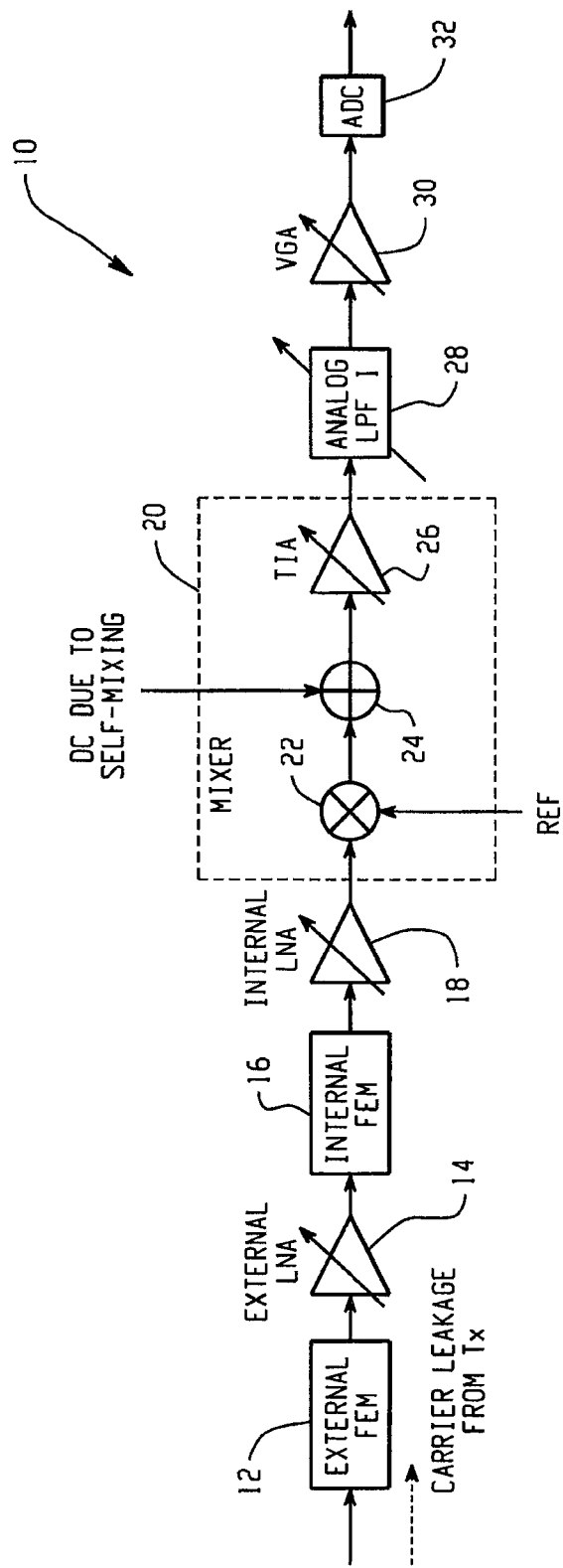
FIG. 1 is a block diagram of an example direct-conversion receiver.

FIG. 1 is a block diagram depicting an analog portion of an example direct-conversion receiver 10, and illustrating how DC offset is typically introduced in the receiver 10. The example receiver 10 receives a multi-carrier modulated (MCM) signal, such as an OFDM signal, via an external front end module (FEM) 12 that connects the receiver to an antenna (not shown). The received signal is first amplified by an external (off-chip) low-noise amplifier (LNA) 14 and the amplified signal is directed to a receiver integrated circuit (IC) via an internal FEM 16. Within the receiver IC, the signal is further amplified by an internal LNA 18 and is then combined with a local reference signal by a mixer 20. To help illustrate how DC offset is introduced by the mixer 20, a model of the mixer 20 is shown in FIG. 1 with three components 22, 24, 26. The first mixer component 22 in the mixer 20 depicts the mixing function, the second mixer component 24 is included in the model to show the introduction of DC offset, and the third mixer component 26 is included to illustrate the gain introduced by the mixer 20. The output of the mixer 20 is filtered by an adjustable gain low-pass filter (LPF) 28, further amplified by a variable gain amplifier (VGA) 30, and converted into a digital signal by an analog-to-digital converter 32.

As illustrated in FIG. 1, there are typically three predominant sources of DC offset from the analog domain in a direct-conversion receiver 10. The primary source is typically self mixing at the RF mixer 20. In addition, each analog component in the receiver introduces some amount of DC offset, and DC offset is typically introduced due to carrier leakage from the transmitter. The technology described herein proposes ways to reduce or eliminate this DC offset using average-based processes applied after analog-to-digital conversion. These average-based approaches introduce less distortion and take less time compared to traditional high pass filter methods.

Figure 2:
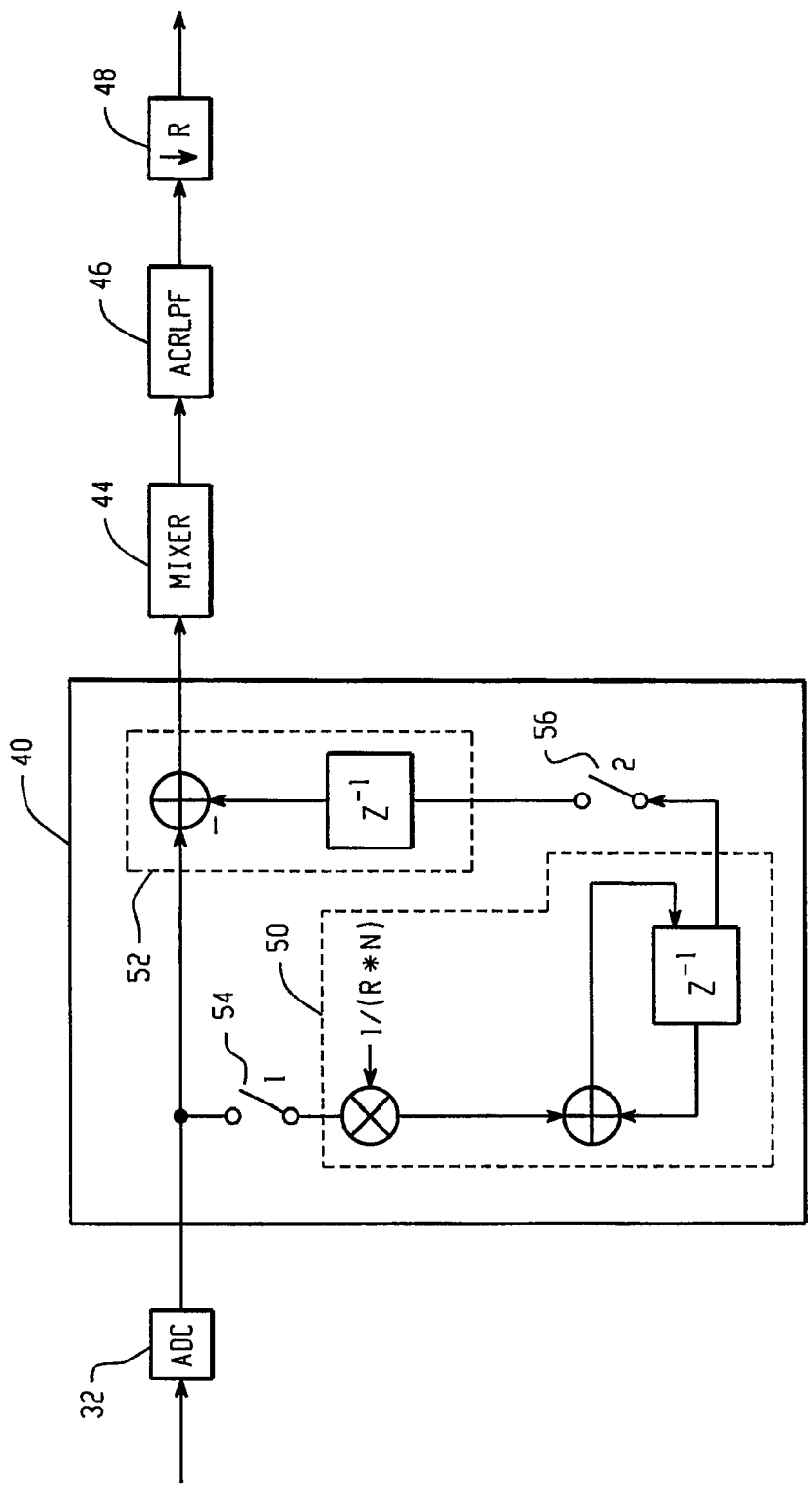
FIG. 2 is a block diagram of a first example DC calibration circuit in a receiver.

FIG. 2 is a block diagram of a first example DC calibration circuit 40 in a receiver. Also shown in the receiver chain is an analog-to-digital converter 32 that converts a MCM signal (e.g., an OFDM signal) from the analog domain to the digital domain, a digital mixer 44 that compensates for the carrier frequency offset, a digital low pass filter 46, and a down converter 48 that down-samples the signal to the Nyquist rate. The DC calibration circuit 40 may, for example, be included after the analog-to-digital converter (ADC) 32 in the direct-conversion receiver 10 illustrated in FIG. 1.

In operation, the DC calibration circuit 40 takes a symbol average of received digital samples as the estimated DC offset, and applies the estimated DC offset to correct the next MCM symbol in the digital MCM signal. In one implementation, the DC calibration circuit 40 includes an accumulator 50, a compensator 52, a first timer 54 and a second timer 56. The first timer 54 is turned on at the start of a current MCM symbol in the digital MCM signal and is turned off at the current MCM symbol end in order to input the current MCM symbol to the accumulator 50. The accumulator 50 includes a multiplier and a memory element ($Z^{-1}$), such as a shift register, that is coupled in a feedback loop with a summation element. The accumulator 50 determines the symbol average of the current MCM symbol by dividing each received digital sample by the total number of digital samples in the current MCM symbol (8N) and then accumulating the summation of the divided samples in the memory element ($Z^{-1}$). The symbol average provides an estimate of the DC offset in the current MCM symbol. In the illustrated example, the received MCM signal is over-sampled by a predetermined factor (R), and thus the total number of digital samples in a MCM symbol is R*N, where N is the number of digital samples if sampled at Nyquist rate. For instance, in one example the received MCM signal may be over-sampled by a factor of eight, and thus the total number of digital samples in the MCM symbol would be 8N.

At the start of the next MCM symbol, the second timer 56 in the DC calibration circuit 40 is turned on to pass the DC estimate from the accumulator 50 to the compensator 52. The compensator 52 includes a memory element ($Z^{-1}$), such as a shift register, for storing the DC estimate, and a summation element for subtracting the DC estimate from the digital MCM signal. After the DC estimate is loaded to the compensator, the second timer 56 is turned off and the compensator 52 subtracts the DC estimate from the next MCM symbol to compensate for DC offset in the MCM signal. In this manner, the DC calibration circuit 40 provides DC cancellation for all MCM symbols except for the first (beginning) MCM symbol.

Some amount of DC offset may be acceptable in the first MCM symbol for many applications. For example, a WiMax system uses the first MCM symbol as a preamble that does not carry any data information, and so more performance degradation in the first MCM symbol is typically acceptable. Accordingly, the DC calibration circuit depicted in FIG. 2 will provide sufficient DC offset calibration for many applications, even though DC offset remains in the first MCM symbol.

Figure 3:
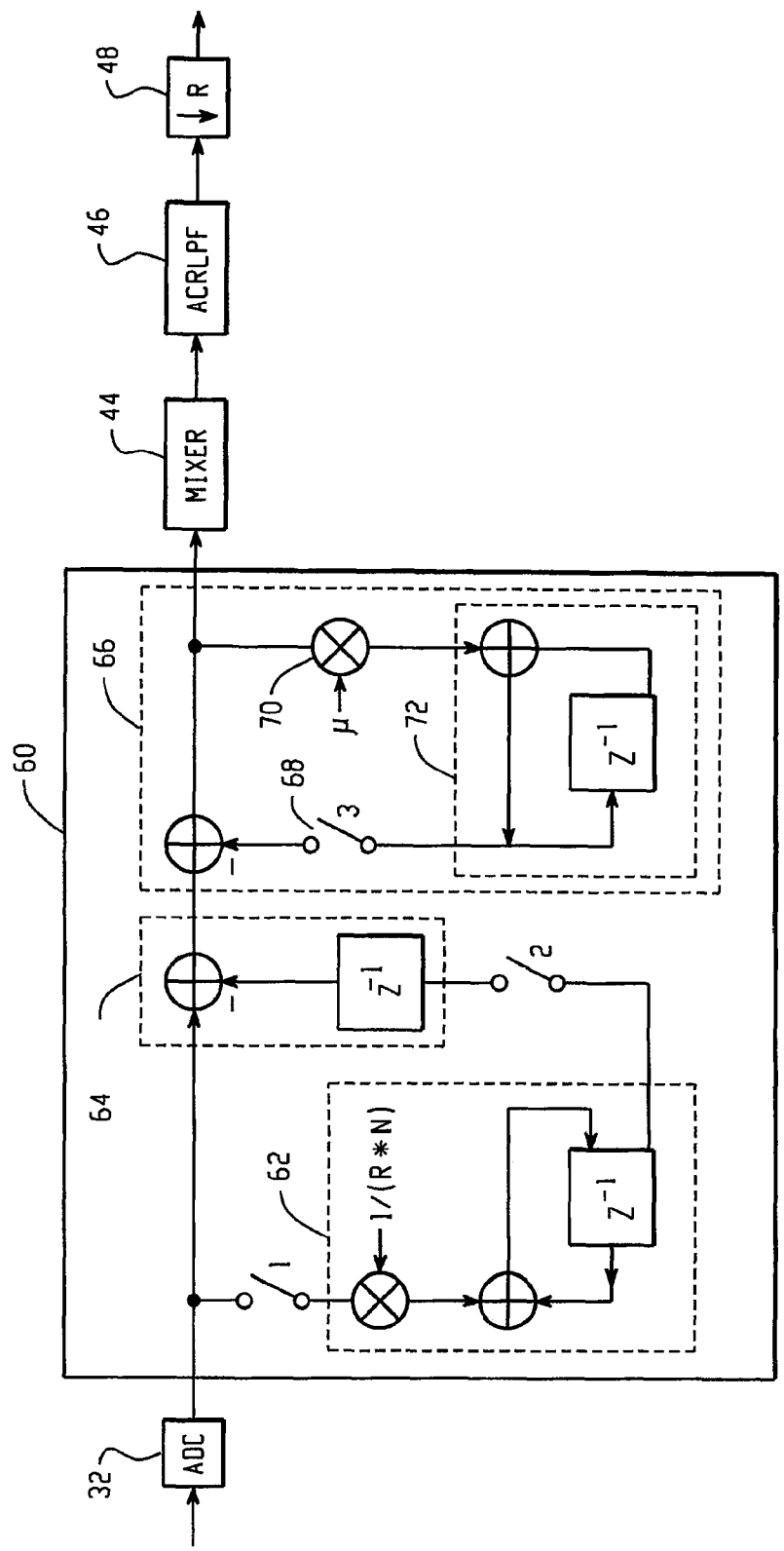
FIG. 3 is a block diagram of a second example DC calibration circuit in a receiver.

FIG. 3 is a block diagram of a second example DC calibration circuit 60 in a receiver. This example DC calibration circuit 60 is similar to the example shown in FIG. 2, with the addition of a filter circuit 66 that is used to compensate for DC offset in the first MCM symbol. Specifically, the DC calibration circuit 60 includes an accumulator 62 that takes a weighted symbol average of received digital samples as the estimated DC offset, and a compensator 64 that applies the estimated DC offset to correct the next MCM symbol in the digital MCM signal, as described above with reference to FIG. 2. In addition, the DC calibration circuit 60 also includes a filter circuit 66 that corrects for DC offset in the first MCM symbol. The filter circuit 66 is a fast-loop digital high-pass filter that is coupled to the digital MCM signal by a third timer 68 during the first MCM symbol and is then turned off during the rest of the sequence of MCM symbols. The filter circuit 66 includes a multiplier 70 for applying a programmable filter coefficient (μ) to the received digital samples of the first MCM symbol and an accumulator 72 for summing the filtered digital samples to produce a DC correction value that is subtracted from the digital MCM signal.

Figure 4:
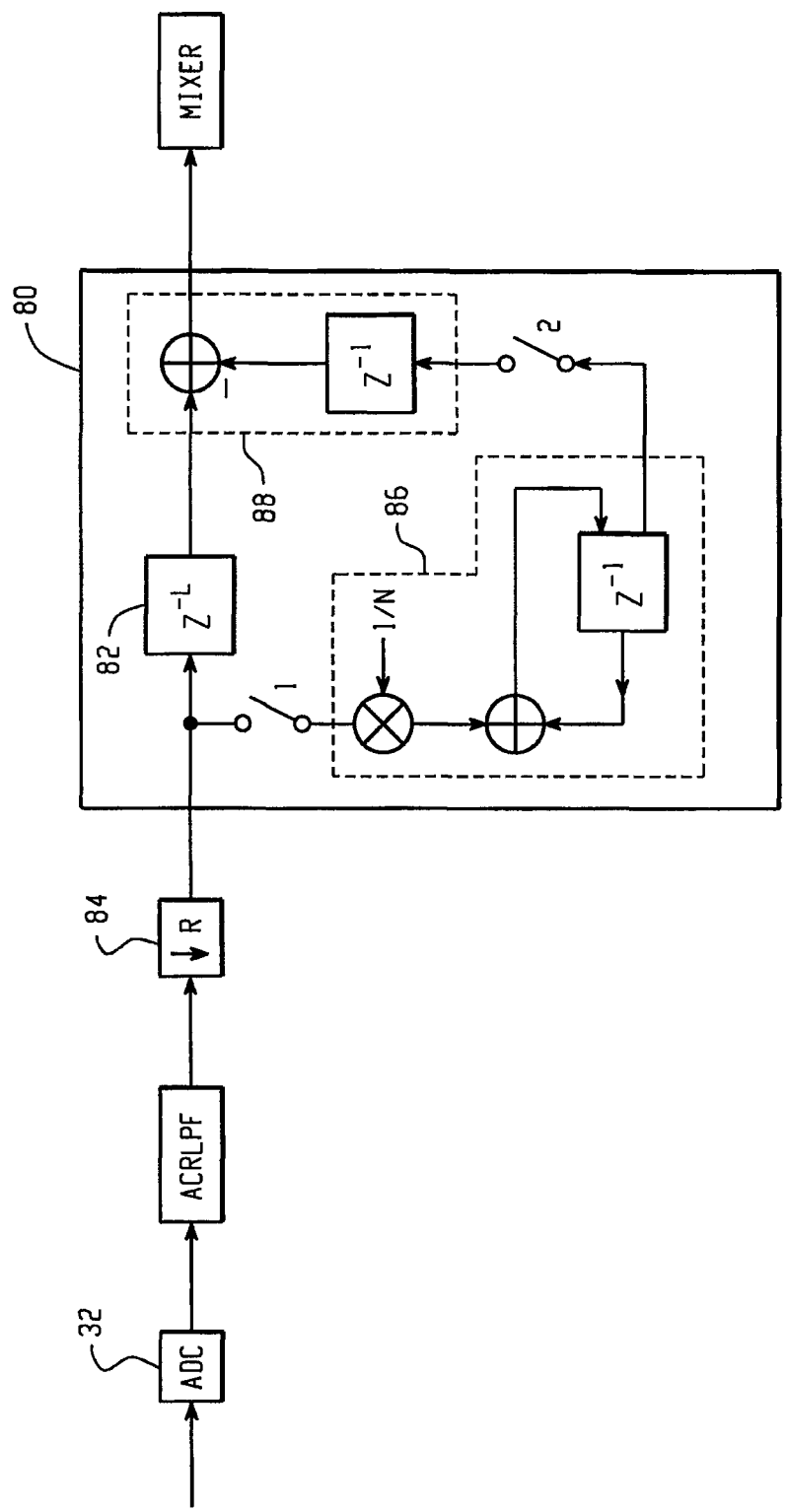
FIG. 4 is a block diagram of a third example DC calibration circuit in a receiver.

The example DC calibration circuit 60 of FIG. 3 may offer better performance than the example shown in FIG. 2 because the DC calibration circuit 60 also corrects for DC offset in the first MCM symbol. However, the example DC calibration circuits in FIGS. 2 and 3 may both suffer from performance degradation in the case of time-varying DC offset (i.e., DC offset that varies from symbol to symbol). FIG. 4 is a block diagram of a third example DC calibration circuit 80 that also corrects for time-varying DC offset.

The DC calibration circuit 80 shown in FIG. 4 includes a memory element 82, such as a shift register, that stores the received MCM symbol so that DC offset may be estimated and corrected for the current MCM symbol. This offers improved performance over the examples illustrated in FIGS. 2 and 3. However, the improved performance is provided at the cost of adding an additional memory element to the circuit that needs to be sufficiently large to store an entire MCM symbol. In order to reduce the size of the memory element 82, the DC calibration circuit 80 may be added to the receiver after the down-converter 84, as shown in FIG. 4. In this way, the OFDM signal is down sampled to the Nyquist rate prior to DC correction, and a smaller memory element 82 may be used.

In operation, the DC calibration circuit 80 stores each successive MCM symbol in the memory element 82 as the MCM symbol is received from the down-converter 84. At the same time, the symbol average of the received digital samples is determined by the accumulator 86 to provide an estimate of the DC offset in the MCM symbol. The accumulator 86 operates similarly to the accumulator 50 described above with reference to FIG. 2, except that each digital sample is divided by N (the Nyquist rate) instead of R*N because the MCM symbol has been down-sampled by a factor of R. When the DC estimate is determined, the DC estimate is passed from the accumulator 86 to the compensator 88, which subtracts the DC estimate from the MCM symbol stored in the memory element 82.

Figure 5:
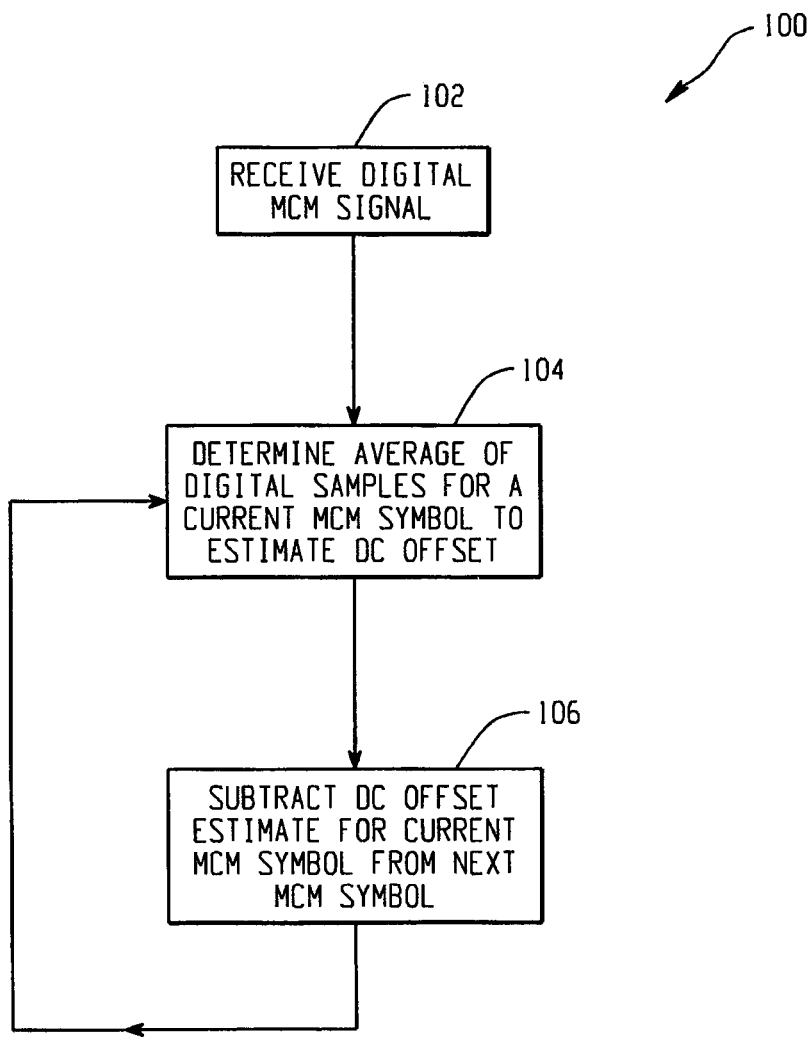
FIG. 5 is a flow diagram of a first example method for calibrating digital baseband DC offset in a multi-carrier modulation (MCM) receiver

FIG. 5 is a flow diagram of a first example method 100 for calibrating digital baseband DC offset in a MCM receiver. In step 102, a digital MCM signal (e.g., a digital OFDM signal) is received that includes a sequence of MCM symbols, with each of the sequence of MCM symbols including a plurality of digital samples. The digital MCM signal may, for example, be received from an analog-to-digital converter in a receiver chain. In step 104, an average of the plurality of digital samples is determined for a current MCM symbol in the sequence of MCM symbols. The average provides an estimated DC offset for the current MCM symbol. In step 106, the estimated DC offset is subtracted from a next MCM symbol in the sequence of MCM symbols. The method 100 then repeats to step 104 such that the symbol average for each received MCM symbol is used to correct the DC offset in the subsequently received MCM symbol.

Figure 6:
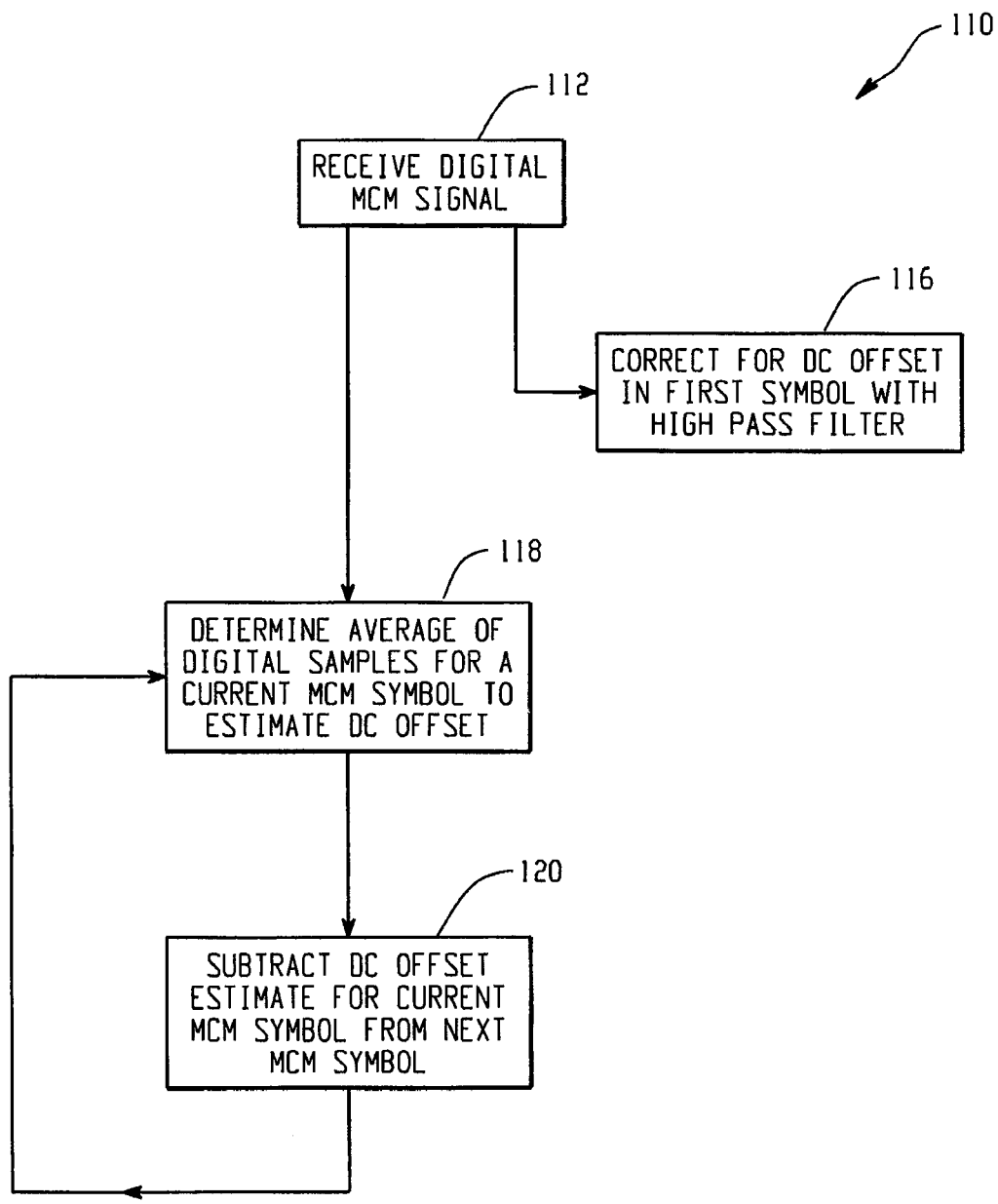
FIG. 6 is a flow diagram of a second example method for calibrating digital baseband DC offset in a MCM receiver.

FIG. 6 is a flow diagram of a second example method 110 for calibrating digital baseband DC offset in a MCM receiver. In step 112, a digital MCM signal (e.g., a digital OFDM signal) is received that includes a sequence of MCM symbols, with each of the sequence of MCM symbols including a plurality of digital samples. The digital MCM signal may, for example, be received from an analog-to-digital converter in a receiver chain. In step 116, the DC offset in the first MCM symbol in the sequence is corrected using a high pass filter circuit. In step 118, an average of the plurality of digital samples is determined for the current MCM symbol in the sequence of MCM symbols. The average provides an estimated DC offset for the current MCM symbol. In step 120, the estimated DC offset is subtracted from a next MCM symbol in the sequence of MCM symbols. The method 110 then repeats to step 118 such that the symbol average for each received MCM symbol is used to correct the DC offset in the subsequently received MCM symbol.

Figure 7:
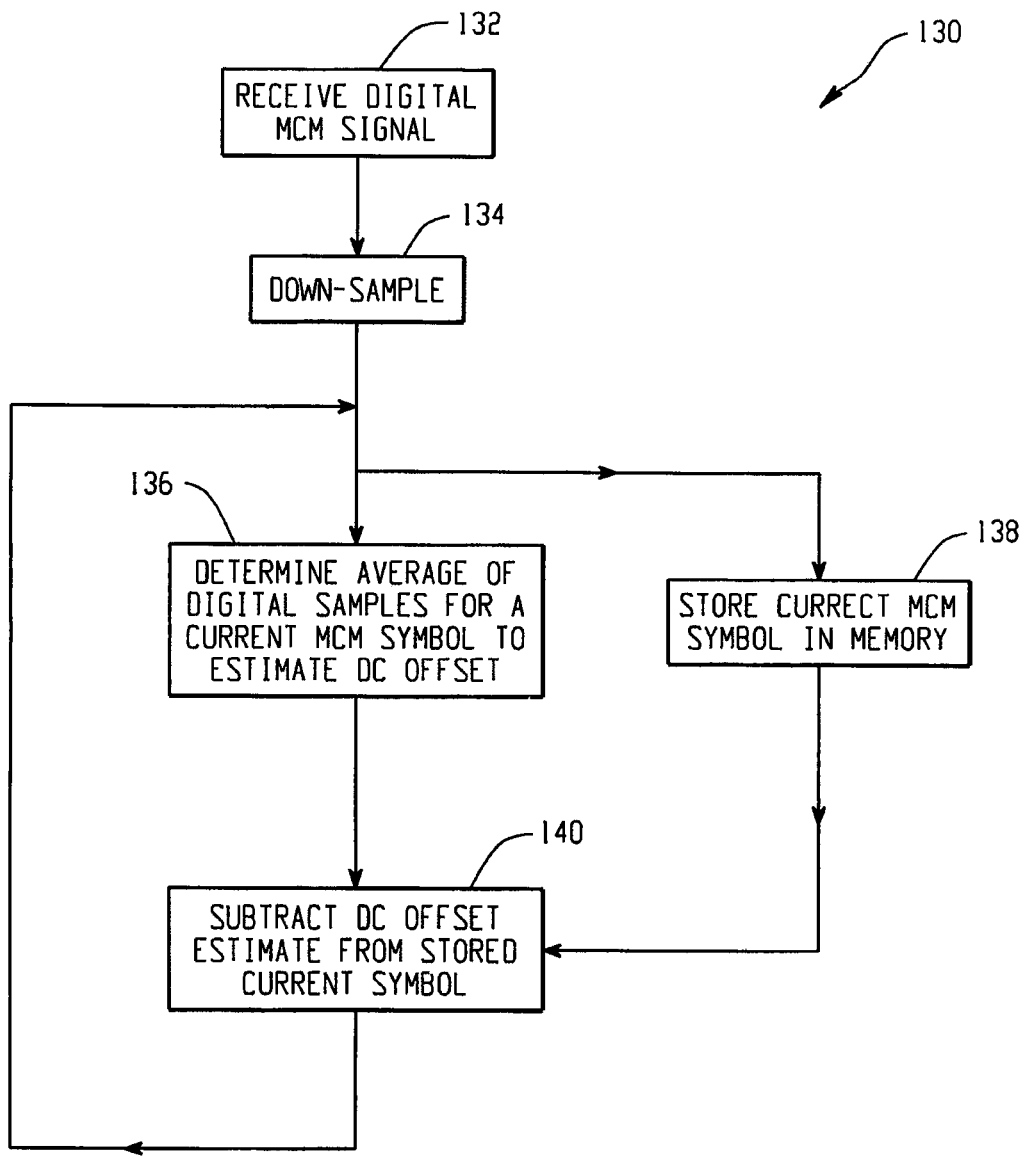
FIG. 7 is a flow diagram of a third example method for calibrating digital baseband DC offset in a MCM receiver.

FIG. 7 is a flow diagram of a third example method 130 for calibrating digital baseband DC offset in a MCM receiver. In step 132, a digital MCM signal (e.g., a digital OFDM signal) is received that includes a sequence of MCM symbols, with each of the sequence of MCM symbols including a plurality of digital samples. The digital MCM signal may, for example, be received from an analog-to-digital converter in a receiver chain. In step 134, the digital MCM signal is down-sampled, for example to the Nyquist rate. After step 134, the method 130 proceeds simultaneously to steps 136 and 138.

In step 136, an average of the plurality of digital samples is determined for a current MCM symbol in the sequence of MCM symbols. The average provides an estimated DC offset for the current MCM symbol. At the same time, the current MCM symbol is stored in a memory element, such as a shift register, at step 138. In step 140, the estimated DC offset is subtracted from the current MCM symbol that was stored in the memory element. The method 130 then repeats to steps 136 and 138 to process the next MCM symbol in the sequence.

This written description uses examples to disclose the invention, including the best mode, and also to enable a person skilled in the art to make and use the invention. The patentable scope of the invention may include other examples that occur to those skilled in the art.

It is claimed:

1. A DC calibration circuit configured to remove DC offset from a digital multi-carrier modulated (MCM) signal that includes a sequence of MCM symbols, the DC calibration circuit comprising:

an accumulator configured to receive a first symbol in the sequence of symbols and calculate an estimated DC offset as an average of digital samples of the first symbol;

a compensator configured to subtract the estimated DC offset from a subsequent symbol in the sequence of symbols;

a first timed switch that is timed to pass the signal to the accumulator while the first symbol is being received by the DC calibration circuit; and a second timed switch that is timed to pass the estimated DC offset from the accumulator to the compensator after completion of receiving of the first symbol by the accumulator, such that the estimated DC offset is applied to the signal by the compensator while the subsequent symbol is received by the DC calibration circuit.

2. The DC calibration circuit of claim 1 wherein the signal is an orthogonal frequency-division multiplexed (OFDM) signal.

3. The DC calibration circuit of claim 1 wherein the compensator comprises:
 a memory element to receive the estimated DC offset from the accumulator, and
 a summation element to subtract the estimated DC offset from the subsequent symbol.

4. The DC calibration circuit of claim 1 wherein the compensator is configured to subtract the DC offset from the subsequent symbol but not from the first symbol.

5. The DC calibration circuit of claim 4 further comprising;
 a filter circuit configured to correct for DC offset in the first symbol but not in the subsequent symbol.

6. A DC calibration circuit configured to remove DC offset from a digital multi-carrier modulated (MCM) signal that includes a sequence of MCM symbols, the DC calibration circuit comprising:
 an accumulator configured to receive each symbol in the sequence of symbols and calculate, for each respective symbol, an estimated DC offset as an average of digital samples of the respective symbol;
 a compensator configured to subtract the estimated DC offset from the respective symbol;
 a first timed switch that is timed to pass the signal to the accumulator while the respective symbol is received by the DC calibration circuit;
 a memory device configured to store the respective symbol as it is being received by the DC calibration circuit and to pass the respective symbol to the accumulator after receipt of the respective symbol is completed; and
 a second timed switch that is timed to pass the estimated DC offset from the accumulator to the compensator after receipt of the respective symbol is completed, such that the estimated DC offset is applied to the respective symbol.

7. The DC calibration circuit of claim 6 wherein the signal is an orthogonal frequency-division multiplexed (OFDM) signal.

8. The DC calibration circuit of claim 6 wherein the compensator comprises:
 a memory element to receive the estimated. DC offset from the accumulator; and
 a summation element to subtract the estimated DC offset from the respective symbol.

9. The DC calibration circuit of claim 6 wherein the compensator is configured to subtract the DC offset from the respective symbol but not from the first symbol.

10. The DC calibration circuit of claim 6 wherein the memory device comprises a shift register.

* * * * *